(12) United States Patent
Zhao

(10) Patent No.: US 12,267,579 B2
(45) Date of Patent: Apr. 1, 2025

(54) METHOD, ELECTRONIC DEVICE AND STORAGE MEDIUM FOR CAPTURING

(71) Applicant: Beijing Zitiao Network Technology Co., Ltd., Beijing (CN)

(72) Inventor: Shijia Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/535,045

(22) Filed: Dec. 11, 2023

(65) Prior Publication Data
US 2024/0129624 A1   Apr. 18, 2024

Related U.S. Application Data

(63) Continuation of application No. PCT/CN2022/112921, filed on Aug. 17, 2022.

(30) Foreign Application Priority Data

Sep. 3, 2021   (CN) .......................... 202111033948.3

(51) Int. Cl.
  *H04N 23/60*   (2023.01)
  *H04N 23/611*   (2023.01)
  *H04N 23/63*   (2023.01)

(52) U.S. Cl.
  CPC ........... *H04N 23/64* (2023.01); *H04N 23/611* (2023.01); *H04N 23/632* (2023.01); *H04N 23/633* (2023.01)

(58) Field of Classification Search
  CPC .... H04N 23/64; H04N 23/633; H04N 23/632; H04N 23/611
  See application file for complete search history.

(56) References Cited

U.S. PATENT DOCUMENTS

| 6,963,360 B1* | 11/2005 | Esquibel | .............. H04N 23/667 |
| | | | 348/211.6 |
| 2007/0002157 A1 | 1/2007 | Shintani et al. | |

(Continued)

FOREIGN PATENT DOCUMENTS

| CN | 110475069 A | 11/2019 |
| CN | 111062276 A | 4/2020 |

(Continued)

OTHER PUBLICATIONS

International Search Report (with English translation) and Written Opinion issued in PCT/CN2022/112921, dated Nov. 11, 2022, 8 pages provided.

(Continued)

*Primary Examiner* — Amy R Hsu
(74) *Attorney, Agent, or Firm* — Fish & Richardson P.C.

(57) ABSTRACT

Embodiments of this disclosure provided a method, electronic device and storage medium for capturing. The method includes: while displaying a capturing page, determining a current key part proportion information based on a current preview image collected by a camera, wherein the current key part proportion information is information on proportion of key parts of a subject in the current preview image collected by the camera; generating current capturing prompt information based on the current key part proportion information, and presenting the current capturing prompt information in the capturing page, the current capturing prompt information comprising at least one of capturing angle prompt information or capturing distance prompt information; and in response to a capturing instruction, controlling the camera to capture the subject.

20 Claims, 5 Drawing Sheets

(56) References Cited

U.S. PATENT DOCUMENTS

| | | | |
|---|---|---|---|
| 2012/0321131 A1 | 12/2012 | Kobayashi | |
| 2013/0155249 A1* | 6/2013 | Neeley | H04N 5/33 |
| | | | 348/E5.09 |
| 2013/0342729 A1* | 12/2013 | Kim | H04N 9/8233 |
| | | | 348/231.3 |
| 2020/0293752 A1* | 9/2020 | Lin | H04N 23/611 |
| 2020/0374456 A1* | 11/2020 | Kelly | H04N 23/66 |

FOREIGN PATENT DOCUMENTS

| | | | |
|---|---|---|---|
| CN | 111263066 A | 6/2020 | |
| JP | 2007013768 A | 1/2007 | |
| JP | 2010114708 A | 5/2010 | |
| JP | 2011061452 A | 3/2011 | |
| JP | 2013021680 A | 1/2013 | |
| KR | 20190085787 A | 7/2019 | |
| WO | 2021135601 A1 | 7/2021 | |
| WO | 2021169394 A1 | 9/2021 | |

OTHER PUBLICATIONS

The extended European search report issued in European Application No. 22863132.1, dated Sep. 3, 2024.

International Preliminary Report on Patentability in International Appln. No. PCT/CN2022/112921, mailed on Nov. 11, 2022, 9 pages (with English translation).

Office Action in Japanese Appln. No. 2023-576334, dated Dec. 10, 2024, 8 pages (with English translation).

* cited by examiner

METHOD, ELECTRONIC DEVICE AND STORAGE MEDIUM FOR CAPTURING

CROSS-REFERENCE

This application is a continuation of International Patent Application No. PCT/CN2022/112921, filed on Aug. 17, 2022, which claims the benefit of Chinese Patent Application No. 202111033948.3 filed on Sep. 3, 2021, both of which are incorporated herein by reference in their entireties.

FIELD

Embodiments of the present disclosure relates to the capturing field, for example, to a method, apparatus, electronic device, and storage medium for capturing.

BACKGROUND

In related art, users may capture through terminal devices. However, due to the lack of capturing experience, it is common to encounter situations where the capturing effect of captured videos or pictures is not ideal, causing the users to spend a lot of energy to find a suitable method of capturing to re-capture or retouch the captured videos or pictures, resulting in a poor capturing experience.

SUMMARY

The embodiments of the present disclosure provide a method, apparatus, electronic device and storage medium for capturing, to improve the capturing effect of videos or pictures.

In a first aspect, the embodiments of the present disclosure provide a method of capturing, comprising:
 while displaying a capturing page, determining a current key part proportion information based on a current preview image collected by a camera, wherein the current key part proportion information is information on proportion of key parts of a subject in the current preview image collected by the camera;
 generating current capturing prompt information based on the current key part proportion information, and presenting the current capturing prompt information in the capturing page, the current capturing prompt information comprising at least one of capturing angle prompt information or capturing distance prompt information; and
 in response to a capturing instruction, controlling the camera to capture the subject.

In a second aspect, the embodiments of the present disclosure further provide an apparatus for capturing, comprising:
 a proportion information determination module configured to, while displaying a capturing page, determine a current key part proportion information based on a current preview image collected by a camera, wherein the current key part proportion information is information on proportion of key parts of a subject in the current preview image collected by the camera;
 a prompt information presentation module configured to generate current capturing prompt information based on the current key part proportion information, and presenting the current capturing prompt information in the capturing page, the current capturing prompt information comprising at least one of capturing angle prompt information or capturing distance prompt information; and
 a capturing module configured to in response to a capturing instruction, control the camera to capture the subject.

In a third aspect, the embodiments of the present disclosure further provide an electronic device, comprising:
 a processor; and
 a memory for storing a program,
  when the program is executed by the processor, the processor implements a method of capturing according to the embodiments of the present disclosure.

In a fourth aspect, the embodiments of the present disclosure further provide a computer readable storage medium having stored thereon a computer program, the computer program executable by a processor to implement a method of capturing according to the embodiments of the present disclosure.

BRIEF DESCRIPTION OF THE DRAWINGS

The above and other features, advantages, and aspects of the embodiments of the present disclosure will become more apparent in conjunction with the accompanying drawings and with reference to the following detailed description. Throughout the drawings, the same or similar reference numerals refer to the same or similar elements. It should be understood that the drawings are illustrative and that the components and elements are not necessarily drawn to scale.

DETAILED DESCRIPTION

Figure 1:
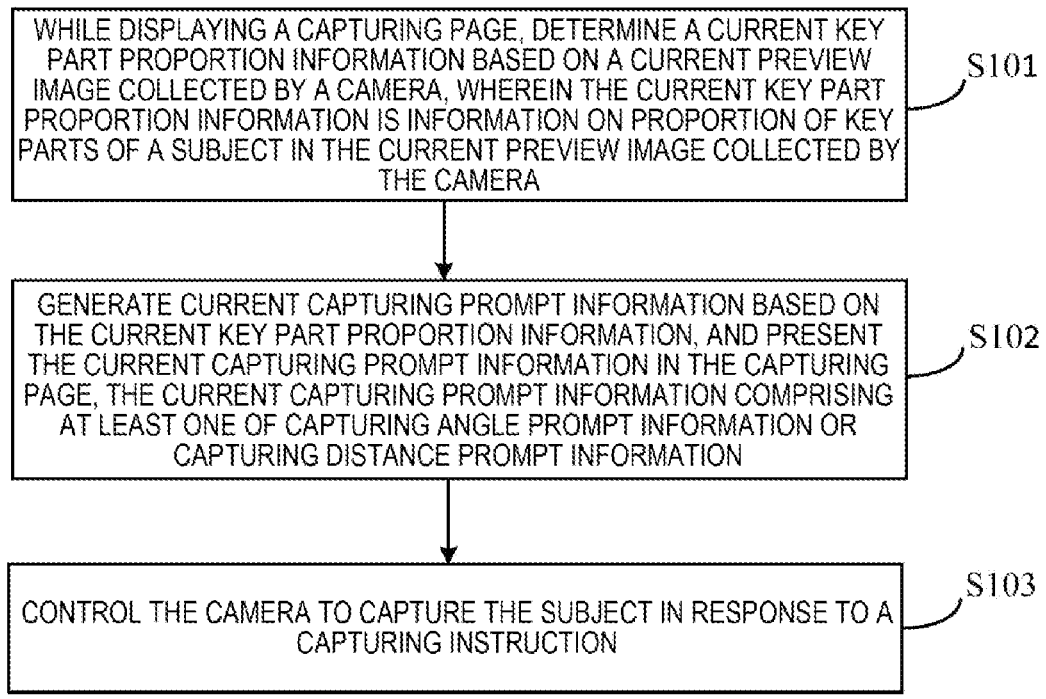
FIG. 1 is a schematic flowchart of a method of capturing provided by the embodiments of the present disclosure.

The embodiments of the present disclosure will be described in more detail below with reference to the accompanying drawings. Although certain embodiments of the present disclosure are shown in the drawing, it should be understood that the present disclosure may be implemented in various forms and should not be explained as limited to the embodiments set forth herein. On the contrary, these embodiments are provided for a more thorough and complete understanding of the present disclosure. It should be understood that the drawings and embodiments of the present disclosure are for illustrative purposes only.

It should be understood that various steps described in method implementations of the present disclosure may be executed in different orders and/or in parallel. In addition, the method implementations may include additional steps and/or omit performance of illustrated steps.

As used herein, the term "include" and its variations are open-ended, i.e., "including but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that concepts such as "first" and "second" mentioned in this disclosure are only used to distinguish different devices, modules, or units, and are not used to limit the order or interdependence of the functions performed by these devices, modules, or units.

It should be noted that the modifications of "one" and "plurality" mentioned in this disclosure are illustrative and not restrictive. Those skilled in the art should understand that unless the context clearly indicates otherwise, it should be understood as "one or more".

The names of messages or information exchanged between a plurality of apparatuses in the present disclosure are for illustrative purposes only and are not intended to limit the scope of such messages or information.

FIG. 1 is a schematic flowchart of a method of capturing provided by the embodiments of the present disclosure. The method may be performed by an apparatus for capturing, wherein the apparatus may be implemented by at least one of software or hardware, and may be configured in an electronic device, typically in a mobile phone or tablet. The method of capturing provided by the embodiments of the present disclosure is suitable for guiding at least one of a capturing posture, a capturing angle, or a capturing distance of the user. As shown in FIG. 1, the method of capturing provided by this embodiment may include the followings.

S101, while displaying a capturing page, determine a current key part proportion information based on a current preview image collected by a camera, wherein the current key part proportion information is information on proportion of key parts of a subject in the current preview image collected by the camera.

The subject may be understood as an object captured by the electronic device, such as a person or animal captured by the electronic device. The following takes the subject as a person as an example. The current key part proportion information may be understood as key part proportion information of the capturer in the current preview image. The key part proportion information may be proportion information of key parts of the subject in the capturer's body, or proportion information between the key parts of the subject and a predetermined part of the subject. The proportion information between the key part proportion information of the subject and the predetermined part of the subject will be described as the key part proportion information as an example below. The key parts may include at least one of the head or legs; the proportion information may be length proportion information, such as proportion information parallel to the direction of the human body; the predetermined part may be the upper body of the subject (such as including or excluding the head).

Exemplarily, the electronic device displays a capturing page and periodically determines the current key part proportion information of the subject in the current preview image collected by the camera during the process of displaying the capturing page. Taking the key parts including the head and legs, the predetermined parts being the subject's upper body (excluding the head), and the subject standing vertically as an example, the head, legs, and upper body of the subject may be identified based on the current preview image, and the length information of the subject's head, legs, and upper body in the capturing image may be computed based on the length information of the subject's head and upper body to obtain the subject's head proportion information in the current preview image, and the leg proportion information of the subject in the current preview image may be computed based on the length information of the subject's legs and upper body to obtain the subject's current key part proportion information, therefor, the current key proportion information of the subject is obtained.

In one implementation, determining the current key part proportion information based on the current preview image collected by the camera comprises: obtaining the current preview image collected by the camera; determining, based on the current preview image, first key point information of the subject as current posture information of the subject; and determining the current key part proportion information based on the current posture information.

The current preview image may be a preview image displayed in the capturing page at the current time, that is, an image collected by the camera at the current time. The first key point information may be understood as key point information of the subject in the current preview image, such as position information of key points. The key points of the subject may be set as needed. For example, the key points of the subject may include outline points of the subject in the current preview image, that is, the points that constitute a outline of the subject in the current preview image; it may also include the points that constitute the key parts (such as legs or head, etc.) of the subject in the current preview image.

Exemplarily, a model (such as a posture recognition model) capable of recognizing key point information of a subject may be pre-trained. Therefore, when displaying a capturing page, the current preview image collected by the camera may be periodically obtained, the current preview image may be input into the posture recognition model, and the key point information of the subject output by the posture recognition model in the current preview image may be obtained as the current posture information of the subject. The key parts and predetermined part of the subject are recognized based on the current posture information, length information of the key parts of the subject in the preview image and length information of the predetermined part in the preview image are determined, and length proportion information between the key parts and predetermined part of the subject are computed based on the length information as the current key part proportion information of the subject.

S102, generate current capturing prompt information based on the current key part proportion information, and present the current capturing prompt information in the capturing page, the current capturing prompt information comprising at least one of capturing angle prompt information or capturing distance prompt information.

In the present embodiment, while displaying the capturing page, the electronic device may obtain the current key part proportion information of the subject in real time or periodically, and display or update the capturing prompt information displayed in the capturing page according to the current key part proportion information, and perform capturing prompts through the capturing prompt information, so that the subject has a suitable body proportion in the current preview image, so as to avoid appearing in the video or picture obtained by capturing, the body proportion of the subject is not coordinated (such as the head too large or legs too short), and improve the quality of the video or picture obtained by capturing.

Figure 2:
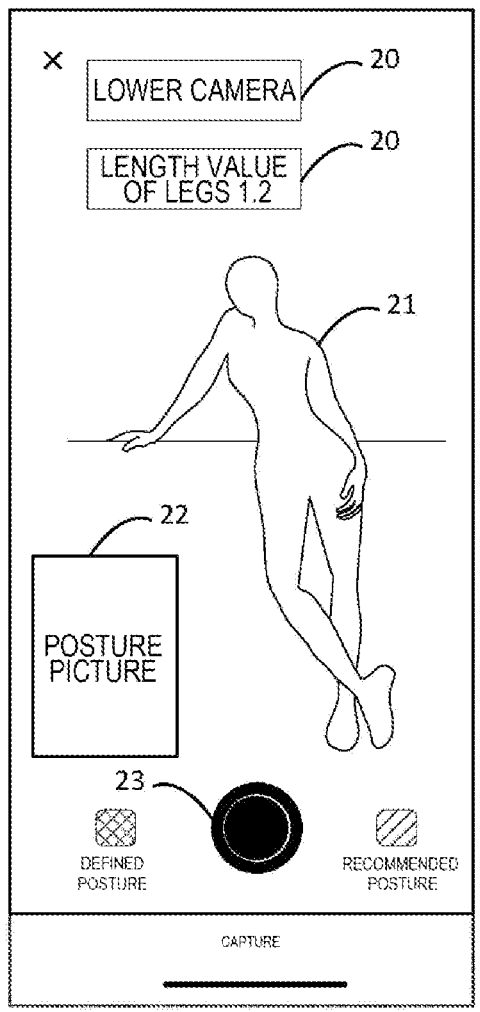
FIG. 2 is a schematic diagram of displaying a capturing page provided by the embodiments of the present disclosure.

Exemplarily, as shown in FIG. 2, when the capturing prompt information is initially displayed (i.e., capturing prompt information has not been displayed in the capturing page), the electronic device may generate the current capturing prompt information based on the current key part proportion information, and display the current capturing prompt information 20 in the capturing page; when the capturing page has displayed capturing prompt information, the electronic device may generate the current capturing prompt information based on the current key part proportion information, and update the capturing prompt information displayed in the capturing page to the current capturing prompt information 20.

In the present embodiment, the current capturing prompt information may be understood as capturing prompt information generated based on the current preview image, and the information content of the current capturing prompt information may be set as needed. For example, the capturing prompt information may include at least one of: current key part proportion information, prompt information of a relative size between the current key part proportion information and the predetermined key part proportion information and capturing correction information.

Optionally, generating the current capturing prompt information based on the current key proportion information includes: using the current key part proportion information as the capturing prompt information; or generating the current capturing prompt information based on a relative size between the current key part proportion information and predetermined key part proportion information; or determining capturing correction information based on deviation information between the current key part proportion information and the predetermined key part proportion information, and using the capturing correction information as the current capturing prompt information. For example, the current key part proportion information may include head proportion information, leg proportion information, or a combination of the above content of the subject in the current preview image; the prompt information of the relative size between the current key part proportion information and a predetermined key part proportion information may be information used to prompt the relative size, such as information for prompting that head proportion/leg proportion is too large or too small; the capturing correction information may be information for correcting a capturing defect by the user at the current time. For example, when a proportion of the subject' head in the current preview image is too large, or, when a proportion of the subject's legs in the current preview image is too small, the user may be prompted to increase the capturing distance (e.g., moving the camera backward), or adjust a capturing angle downward (e.g., moving the camera downward). Exemplarily, if the head proportion of the subject in the current preview image is too large and the leg proportion is too small, the user may be prompted to increase the capturing distance and adjust the capturing angle downward while capturing.

S103, in response to a capturing instruction, control the camera to capture the subject.

In the present embodiment, the electronic device upon receiving the capturing instruction, may control the camera to capture the subject, such as controlling the camera capturing photos or videos. The capturing instruction may be an instruction instructing the electronic device to capture, such as a photography instruction or a video capturing instruction, etc., which may be automatically generated by the electronic device when the current condition meets a predetermined generation condition, such as at least one of a matching degree between the current posture information of the subject and the target posture template and the expression of the subject (such as a degree of smile and a degree of eye opening, etc.). The electronic device may compute an image score of the current preview image and generate a capturing instruction when the image score is greater than a predetermined threshold value. It may also be generated based on the received capturing operation (such as the triggering operation performed on the capturing control 23 shown in FIG. 2), that is, the electronic device may automatically capture, and may capture based on the user's triggering operation.

In one implementation, the method of capturing provided by the present embodiment further comprises: displaying a target posture template over a preview image displayed in the capturing page, wherein the target posture template is used to guide the subject to present a corresponding capturing posture.

In the above implementations, the electronic device may display the target posture template in the capturing page and guide the subject's capturing posture through the target posture template. For example, while the electronic device initially displays the capturing page, it may not immediately generate and display the current capturing prompt information, but in response to a determination that the user has the intention to perform capturing prompt/guidance, such as when receiving a triggering operation using a posture template for capturing guidance, it periodically generates and displays the current capturing prompt information to avoid unnecessary interference to the user and improve the user's capturing experience. The following is an example of this situation.

Optionally, the triggering operation of capturing guidance may be a triggering operation that instructs the electronic device to perform capturing posture guidance through the target posture template, that is, a triggering operation that instructs the electronic device to display the target posture template, such as selecting or importing posture pictures. The target posture template may be a posture template that the user wants to use for capturing guidance, such as a template selected by the user or a template corresponding to the posture picture imported by the user. The template may be a posture outline template, which can be a wireframe diagram composed of the outline of a character and may be used to guide the subject to present the corresponding capturing posture for capturing.

Exemplarily, the electronic device displays a capturing page. When the user wants to use a posture template 21 for capturing guidance, they may perform a triggering operation using the posture template 21 for capturing guidance. If the electronic device detects the user's triggering operation, it may display the posture template 21 over a preview image displayed in the capturing page; and periodically generate the current capturing prompt information 20 while displaying the posture template 21 and display the current capturing prompt information 20 in the capturing page, as shown in FIG. 2.

In the above embodiment, a display mode of the posture template in the capturing page may be set as needed, for example, the posture template may be displayed directly at a predetermined display position of the capturing page. Considering the composition effect of the captured picture/video frame, optionally, the posture template may be displayed according to a display position of the posture template in its corresponding posture picture. That is, the posture template may be displayed at the same display position as the original display position of the posture template in its corresponding posture picture.

In addition, as shown in FIG. 2, when the posture template 21 is displayed in the capturing page, the posture picture 22 corresponding to the posture template 21 may also be displayed in the capturing page, that is, the posture picture 22 on which the posture template 21 is generated is displayed, so that the user may clearly identify the subject and capturing environment in the posture picture 22 corresponding to the capturing template 21.

The method of capturing provided in this embodiment, while displaying a capturing page, determines the current key part proportion information of the subject based on the current preview image collected by a camera; generates current capturing prompt information based on the current key part proportion information, and presenting the current capturing prompt information in the capturing page, the current capturing prompt information comprising at least one of capturing angle prompt information or capturing distance prompt information; in response to the capturing instruction, controls the camera to capture the subject. This embodiment employs the above technical solution and performs at least one of the capturing angle prompt or the capturing distance prompt based on the key part proportion information of the subject in the current preview image, which can make the subject have a suitable body proportion in the picture or video obtained by capturing, improve the imaging effect of the subject, and reduce the difficulty of capturing.

Figure 3:
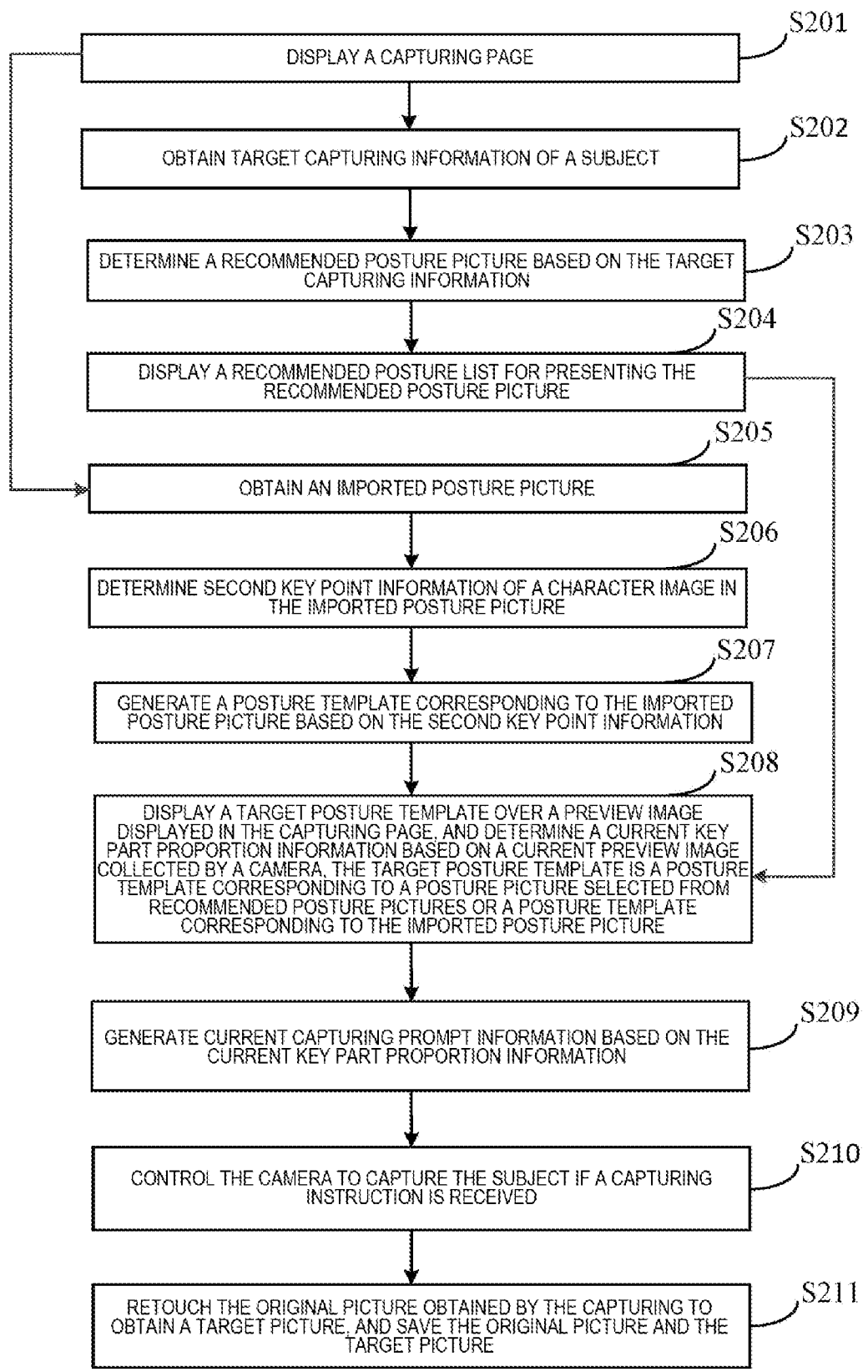
FIG. 3 is a schematic flowchart of another method of capturing provided by the embodiments of the present disclosure.

FIG. 3 is a schematic flow diagram of another method of capturing provided by the embodiments of the present disclosure. The scheme in this embodiment may be combined with one or more optional schemes in the above embodiments. Optionally, the target posture template is a posture template corresponding to a posture picture selected from the recommended posture picture. Before displaying the target posture template over the preview image displayed in the capturing page, the method further comprising: obtaining target capturing information of the subject, wherein the target capturing information comprises at least one of posture information of the subject or capturing environment information when receiving a posture recommendation operation; determining the recommended posture picture based on the target capturing information; and displaying a recommended posture list for presenting the recommended posture picture.

Optionally, the target posture template is a posture template corresponding to an imported posture picture, and before displaying the target posture template over the preview image displayed in the capturing page, the method further comprises: obtaining the imported posture picture; determining second key point information of a character image in the imported posture picture; and generating a posture template corresponding to the imported posture picture based on the second key point information.

Optionally, the capturing instruction is a photography instruction, and after controlling the camera to capture the subject, it further comprises: retouching an original picture obtained by capturing to obtain a target picture, and saving the original picture and the target picture.

Correspondingly, as shown in FIG. 3, the method of capturing provided in the present embodiment may include:

S201, display a capturing page, execute S202 or S205.

S202, obtain target capturing information of a subject, wherein the target capturing information includes at least one of the subject's posture information and capturing environment information when receiving the posture recommendation operation.

In the present embodiment, the electronic device may automatically obtaining target capturing information of the subject while representing the capturing page, and recommend posture pictures based on the target capturing information; it may also obtain the target capturing information of the subject when receiving the triggering operation of the user's recommended posture picture, i.e., while receiving the posture recommendation operation, and recommend the posture picture based on the target capturing information to avoid unnecessary interference to the user due to the automatic display of the recommended posture list. The following will be described in this case as an example.

Optionally, the posture recommendation operation may be an operation indicating the electronic device to display the recommended posture list, such as an operation of triggering the recommended posture control displayed in the capturing page. The target capturing information may be understood as the capturing information of the subject when receiving the posture recommendation operation, which may include at least one of the posture information or the capturing environment information. The posture information may be understood as information for characterizing the capturing posture of the subject, such as the position information of the key points of the subject. The capturing environment information may be understood as information for characterizing the capturing environment in which the subject is located, such as capturing background information, external light information, or a combination of the above.

Figure 4:
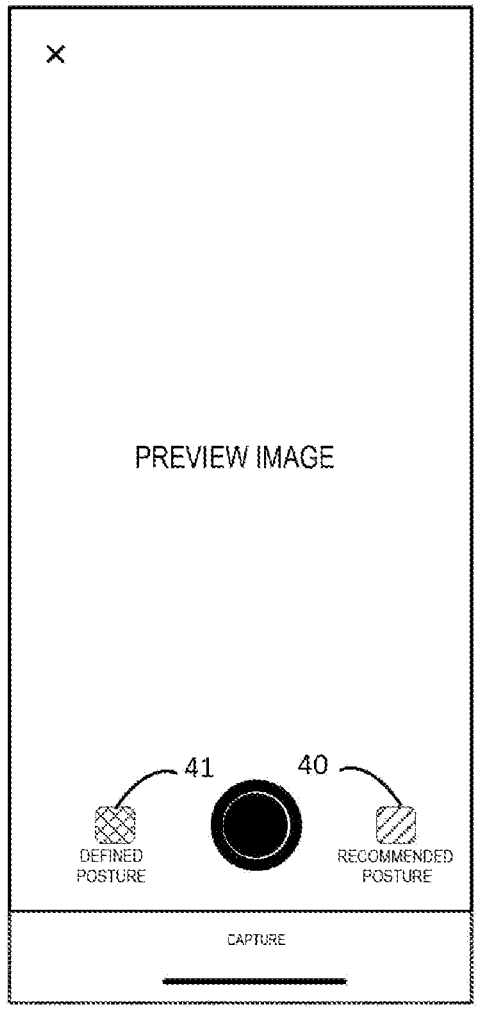
FIG. 4 is a schematic diagram of displaying another capturing page provided by the embodiments of the present disclosure.

Exemplarily, the electronic device displays the capturing page, as shown in FIG. 4. Therefore, when the capturer wants to instruct the electronic device to recommend capturing posture, he may display his own preferred posture (for the case where the capturer is the subject) or instruct the subject to do his own preferred posture (for the case where the capturer is not the subject) and trigger the recommended posture control 40 in the capturing page. Correspondingly, when the electronic device detects that the user triggers the recommended posture control 40 in the capturing page, it may determine that the posture recommendation operation has been received, and in response to the posture recommendation operation, the capturing information of the subject is determined based on the preview image collected by the camera at the current time. For example, the predetermined image is input into the pre-trained posture detection model, and the capturing information of the subject is determined based on the posture detection model.

S203, determine a recommended posture picture based on the target capturing information.

In the present embodiment, the electronic device may determine the recommended posture picture directly based on the target capturing information, for example, obtain capturing information of each posture picture in a posture picture library, calculate the matching degree between the capturing information of each posture picture and the target capturing information, select a certain numer of the posture pictures in order of the matching degree from high to low as recommended posture pictures, or take a posture picture with a matching degree exceeding a predetermined matching degree threshold value as the recommended posture picture, and obtain the determined recommended posture picture.

In addition, the electronic device may further determine the recommended posture picture based on the target capturing information through the server. Optionally, determining the recommended posture picture based on the target capturing information includes: generating a posture picture obtaining request carrying the target capturing information, and sending the posture picture obtaining request to a server to request the server to determine the recommended posture picture based on a matching degree between capturing information of a plurary of posture pictures in a posture picture library and the target capturing information; and receiving the recommended posture picture returned by the server based on the posture picture obtaining request.

Exemplarily, the electronic device may generate a posture picture obtaining request carrying the target capturing information and send the posture picture obtaining request to the server. Therefore, after receiving the posture picture obtaining request sent by the electronic device, the server may parse the posture picture obtaining request to obtain the target capturing information carried in the posture picture obtaining request, compute the matching degree between the capturing information of each posture picture in the posture picture library and the target capturing information, select a certain number of posture pictures in order of the matching degree from high to low as recommended posture pictures, or take a posture picture with a matching degree exceeding a predetermined matching degree threshold value as the recommended posture picture, and send the determined recommended posture picture to the electronic device. Correspondingly, the electronic device may receive the recommended posture picture returned by the server.

In one implementation, a posture picture in the posture picture library may be pre-set, i.e., a picture with better capturing effect may be obtained in advance as the posture picture, and the picture and its corresponding posture template may be stored in the posture picture library.

S204, display a recommended posture list, execute S208, for presenting the recommended posture picture.

Figure 5:
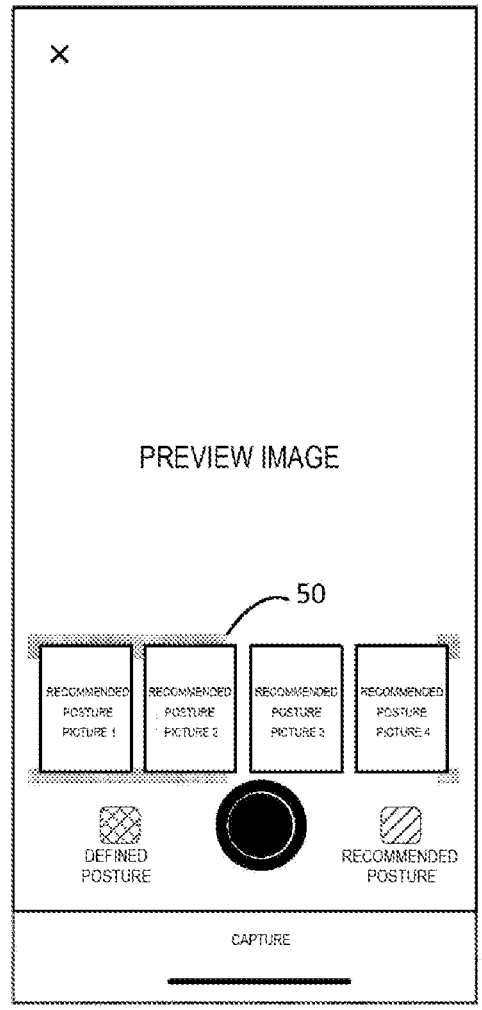
FIG. 5 is a schematic diagram of recommended posture list provided by the embodiments of the present disclosure.

Exemplarily, after obtaining the recommended posture picture, the electronic device may display the recommended posture list 50 in the capturing page and displays the recommended posture picture obtained in the recommended posture list 50, as shown in FIG. 5, for the capturer or the subject to select.

In the present embodiment, the posture picture may be recommended to the user according to the capturing information of the subject at the current time, and a posture guidance can be provided to the user through the posture template corresponding to the posture picture. Therefore, the subject may freely make a posture he likes in the current capturing environment and may recommend similar high-quality posture for the user according to the capturing environment and the posture that the subject likes. By making fine adjustments to the subject's preferred posture, better capturing effect can be achieved without the need for the subject to manually select his preferred posture from a large number of posture pictures. This can solve the problem of the subject not taking a posture during the capturing process, improve the capturing effect of the picture or video, and reduce the time spent in selecting posture template and the difficulty of capturing pictures or videos.

S205, obtain an imported posture picture.

In the present embodiment, it may generate a posture template based on the posture picture imported by the user, and guids the capturing posture of the subject by the posture template.

In one implementation, the posture picture imported may be understood as a imported posture picture.

In the present embodiment, the electronic device may employ a posture template corresponding to the posture picture imported by the user to guide the user for capturing.

Exemplarily, as shown in FIG. 4, the electronic device displays a capturing page. Therefore, when the user wants to use a capturing posture in his favorite posture pictures for capturing, a posture picture import control 41 in the capturing page may be triggered and his favorite posture picture is selected and imported. Correspondingly, the electronic device may obtain the posture picture imported by the user to generate a posture template corresponding to the posture picture based on the posture picture.

S206, determine second key point information of a character image in the imported posture picture.

S207, generate a posture template corresponding to the imported posture picture based on the second key point information.

In the present embodiment, it may generate a posture template for imported posture picture based on key point information of a character image in the imported posture picture. For example, the imported posture picture may be input into a pre-trained posture detection model, key point information (i.e., the second key point information) of one or more objects captured in the imported posture picture output by the posture detection model is obtained, and a posture template corresponding to the posture picture is generated according to the key point information. For example, the key points on the outline of the corresponding object in the picture are connected in the clockwise or counterclockwise direction, and a wireframe diagram of the object is obtained as the posture template corresponding to the imported posture picture.

In addition, when the posture template corresponding to the imported posture picture is obtained, the imported posture picture and the posture template may also be uploaded to the server for storage, such as in the custom space corresponding to the user in the posture picture library, so that the user may subsequently use the posture template again to guide his capturing posture, or based on the posture picture stored in the posture picture library that can be used by all users and the imported posture picture stored in the user's custom space, the posture picture is recommended for the user.

S208, display a target posture template over a preview image displayed in the capturing page, and determine a current key part proportion information based on a current preview image collected by a camera, the target posture template is a posture template corresponding to a posture picture selected from recommended posture pictures or a posture template corresponding to the imported posture picture, for guiding the subject to present the corresponding capturing posture; the current key part proportion information is key part proportion information of the subject in the current preview image collected by camera.

In the present embodiment, the posture template corresponding to the recommended posture picture selected by the user may be displayed over the preview screen displayed in the capturing page, or the posture template corresponding to the posture picture imported by the user may be displayed to guide the subject to present a corresponding capturing posture by the displayed posture template.

When using the posture template corresponding to the recommended posture picture selected by the user to guide the user's capturing posture, exemplarily, as shown in FIG. 5, the electronic device displays the recommended posture list 50, and displays each recommended posture picture in the recommended posture list 50. Therefore, when the user wants to use a capturing posture in a recommended posture picture for capturing, the recommended posture picture may be selected, for example, the recommended posture picture may be triggered. Correspondingly, when detecting that the user triggers a recommended posture picture, the electronic device may take the posture template corresponding to the recommended posture picture as the target posture template and determine that the selection operation of the posture picture corresponding to the target posture template is received, that is, determine that the triggering operation using the target posture template for capturing guidance is received. In response to the triggering operation, the posture template corresponding to the posture picture is used as the target posture template, and the target posture template is displayed over the preview image displayed in the capturing page.

In the present embodiment, when the target posture template is a posture template corresponding to the recommended posture picture, the target posture template may be sent by the server to the electronic device or generated by the electronic device according to the corresponding recommended posture picture. That is, when the server sends each recommended posture picture to the electronic device, a posture template corresponding to each recommended posture picture may be sent simultaneously to the electronic device. Alternatively, the server may only send each recommended posture picture to the electronic device. Therefore, when detecting that the user triggers one recommended posture picture in the recommended posture list, the electronic device may generate its corresponding target posture template according to the recommended posture picture. In additional, when receiving the selection operation on the posture picture corresponding to the target posture template, in addition to performing S208, the electronic device may also close the recommended posture list, so that the user may view the preview image and the target posture template.

S209, generate current capturing prompt information based on the current key part proportion information, and represent the current capturing prompt information in the capturing page. The current capturing prompt information includes at least one of capturing angle prompt information and capturing distance prompt information.

S210, in response to a capturing instruction, control a camera to capture the subject, the capturing instruction is a photography instruction.

S211, retouch an original picture obtained by capturing to obtain a target picture, and save the original picture and the target picture.

The original picture may be a picture obtained by capturing; the target picture may be a picture obtained by retouching the original picture.

In the present embodiment, when the capturing instruction is a capturing instruction, after the capturing is completed, the original picture obtained by capturing may also be retouched to improve the user experience.

Examplary, after capturing to obtain the original picture, the electronic device may input the original picture into a pre-trained retouching model, retouch the original picture through the retouching model to obtain the target picture, while saving the original picture and the target picture obtained from the capturing, and may display the original picture or the target picture, or display the original picture and the target picture correspondingly. The retouching model may be used to retouch the input image (such as the original picture) and output the retouched target picture, which may be pre-trained.

In one embodiment, to improve the retouching effect of the original picture, this embodiment may retouch the original picture according to the posture picture corresponding to the posture template used when taking the original picture, so that the retouched target picture has the same or similar capturing effect as the posture picture, so that the retouched original picture is more in line with the user's (such as the capturer and/or subject) real capturing intention. Optionally, retouching the original picture obtained by capturing to obtain the target picture, including: retouching the original picture based on the picture information of the target posture picture corresponding to the target posture template to obtain the target picture, wherein the picture information includes at least one of color information or image information of the target object in the target posture picture, and the image information includes at least one of size information or position information.

In this embodiment, the target posture template may be a posture template used when taking the original picture. The target posture picture may be a posture picture corresponding to the target posture template. The target object may be understood as an object corresponding to the target posture template in the target posture picture, such as a character and/or animal corresponding to the target posture template. The color information of the target posture picture may be color information of the target posture picture, such as filter information used in the target posture picture. The image information of the target object may include at least one of size information and/or position information of the target object presented in the target posture picture.

Examplary, after obtaining the original picture by capturing, the electronic device may also input the original picture and the target posture picture corresponding to the target posture template used when taking the original picture into another retouching model. The retouching model retouches the original picture based on the color information of the target posture picture, the size information of the target object in the target posture picture, and/or the position information of the target object in the target posture picture. For example, the original picture may be added with the same filter as the target posture picture, and the original picture may be cropped and/or scaled based on the size information and/or position information of the target object in the target posture picture, so that the retouched target picture has a color and/or composition similar to the target posture picture.

The method of capturing provided by this embodiment recommends a posture picture according to the posture of the subject, guides the capturing posture of the user through the posture template corresponding to the posture picture selected or imported by the user, and automatically retouches the original picture after capturing the original picture. It may solve the problem that the subject does not pose when capturing, reduce the difficulty of capturing for the user, and improve the capturing effect of the final picture, thereby improving the user's capturing experience.

Figure 6:
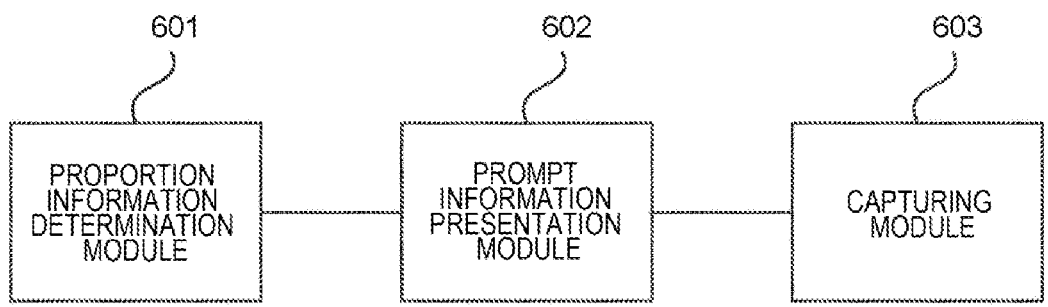
FIG. 6 is a schematic structural block diagram of an apparatus for capturing provided by the embodiments of the present disclosure.

FIG. 6 is a schematic structural block diagram of an apparatus for capturing provided by the embodiments of the present disclosure. The apparatus may be implemented by software and/or hardware. It may be configured in an electronic device, typically in a mobile phone or tablet computer, and may guide at least of the user's capturing distance or the capturing angle by performing the method of capturing. As shown in FIG. 6, the apparatus for capturing provided in the present embodiment may include: a proportion information determination module 601, a prompt information presentation module 602 and a capturing module 603, wherein, the proportion information determination module 601 configured to, while displaying a capturing page, determine a current key part proportion information based on a current preview image collected by a camera, wherein the current key part proportion information is information on proportion of key parts of a subject in the current preview image collected by the camera;

the prompt information presentation module 602 configured to generate current capturing prompt information based on the current key part proportion information, and presenting the current capturing prompt information in the capturing page, the current capturing prompt information comprising at least one of capturing angle prompt information or capturing distance prompt information; and the capturing module 603 configured to in response to a capturing instruction, control the camera to capture the subject.

The apparatus for capturing provided in the present embodiment, by the proportion information determination module while displaying a capturing page, determines a current key part proportion information of the subject based on a current preview image collected by a camera, by the prompt information representation module generates current capturing prompt information based on the current key part proportion information, and presenting the current capturing prompt information in the capturing page, the current capturing prompt information comprising at least one of capturing angle prompt information or capturing distance prompt information; by the capturing module controls the camera to capture the subject in response to a capturing instruction. The present embodiment, by using the above technical solution, prompts at least one of the capturing angle and capturing distance based on the key part proportion information of the subject in the current preview image, and makes the subject have a suitable body proportion in the captured picture/video, improving the imaging effect of the subject and reducing the difficulty of capturing.

In the above embodiment, the proportion information determination module 601 may include: an image obtaining unit configured to obtain the current preview image collected by the camera; a posture information determination unit configured to determine, based on the current preview image, first key point information of the subject as current posture information of the subject; a proportion information determination unit configured to determine the current key part proportion information based on the current posture information.

In the above embodiment, the prompt information presentation module 602 may be configured for: using the current key part proportion information as the current capturing prompt information; or, generating the current capturing prompt information based on a relative size between the current key part proportion information and predetermined key part proportion information; or, determining capturing correction information based on deviation information between the current key part proportion information and the predetermined key part proportion information, and using the capturing correction information as the current capturing prompt information.

In the above embodiment, the prompt information presentation module 602 may further be configured for: displaying a target posture template over a preview image displayed in the capturing page, wherein the target posture template is used to guide the subject to present a corresponding capturing posture.

In the above embodiment, the target posture template may be a posture template corresponding to a posture picture selected from recommended posture pictures, the apparatus for capturing provided in the present embodiment may further include: a capturing information obtaining module configured for obtaining target capturing information of the subject, wherein the target capturing information comprises at least one of posture information of the subject or capturing environment information when receiving a posture recommendation operation; a posture picture determination module configured for determining the recommended posture picture based on the target capturing information; and a posture list display module configured for displaying a recommended posture list for presenting the recommended posture picture.

In the above embodiment, the posture picture determination module may include: a request sending unit configured for generating a posture picture obtaining request carrying the target capturing information, and sending the posture picture obtaining request to a server to request the server to determine the recommended posture picture based on a matching degree between capturing information of a plurary of posture pictures in a posture picture library and the target capturing information; and a posture picture receiving unit configured for receiving the recommended posture picture returned by the server based on the posture picture obtaining request.

In the above embodiment, the target posture template is a posture template corresponding to an imported posture picture, the apparatus for capturing provided in the present embodiment may further include: a picture obtaining module configured for before displaying the target posture template over the preview image displayed in the capturing page, obtaining the imported posture picture; a key point information determination module configured for determining second key point information of a character image in the imported posture picture; and a template generation module configured for generating a posture template corresponding to the imported posture picture based on the second key point information.

Alternatively, the apparatus for capturing provided in the present embodiment may further include: a retouching module configured for, the capturing instruction is a capturing instruction, after controlling the camera to capture the subject, retouching the original picture obtained by the capturing to obtain a target picture, and saving the original picture and the target picture.

In the above embodiment, the retouching module may be configured for: retouching, based on picture information of a target posture picture corresponding to the target posture template, the original picture to obtain the target picture, wherein the picture information comprises at least one of color information of the target posture picture or image information of a target object in the target posture picture, and the image information comprises at least one of size information or position information of the target object.

The apparatus for capturing provided in the embodiments of the present disclosure may perform method of capturing provided in any embodiment of the present disclosure, having corresponding functional modules and beneficial effects for performing the method of capturing. Technical details not described in detail in the present embodiment, the method of capturing provided in any embodiment of the present disclosure may be referred to.

Figure 7:
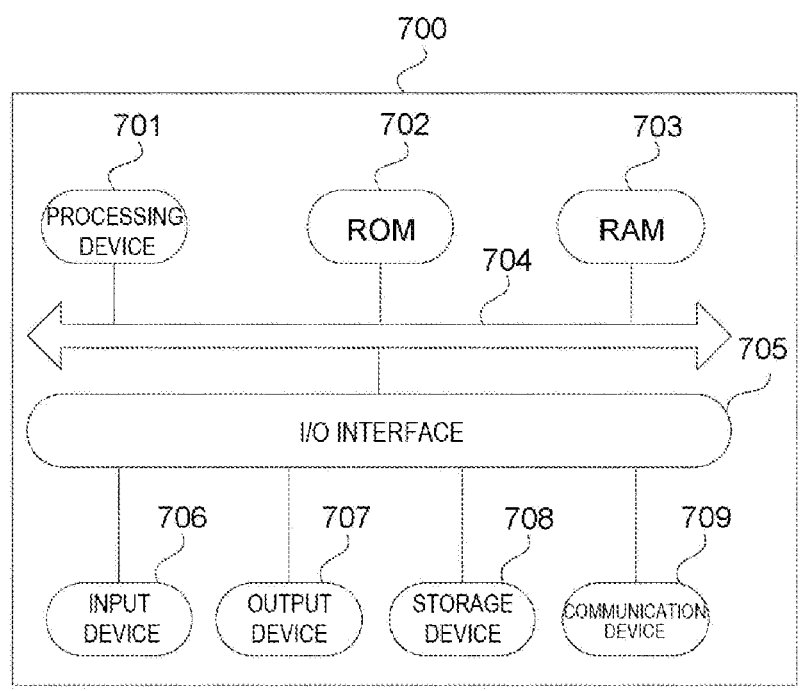
FIG. 7 is a schematic structural diagram of an electronic device provided by the embodiments of the present disclosure.

Referring now to FIG. 7, which is a schematic structural diagram of an electronic device 700 suitable for implementing the embodiments of the present disclosure. The electronic device in the embodiments of the present disclosure may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 7 is merely an example.

As shown in FIG. 7, the electronic device 700 may include a processing device (such as a central processing unit and a graphics processor) 701, which may execute various appropriate actions and processing according to a program stored in a read-only memory (ROM) 702 or a program loaded to a random access memory (RAM) 703 from a storage device 708. Various programs and data required during operation of the electronic device 700 are also stored in the RAM 703. The processing device 701, the ROM 702 and the RAM 703 are connected with one another via a bus 704. An input/output (I/O) interface 705 is also connected to the bus 704.

Generally, the following apparatuses may be connected to the I/O interface 705: an input device 706 including for example a touch screen, a touch pad, a keyboard, a mouse, a camera, a microphone, an accelerometer and a gyroscope; an output device 707 including for example a liquid crystal display (LCD), a speaker and a vibrator; a storage device 708 including for example a magnetic tape and a hard disk; and a communication device 709. The communication device 709 may allow wireless or wired communication between the electronic device 700 and other devices for data exchange. Although FIG. 7 shows the electronic device 700 having various devices, it should be understood that not all the devices shown are necessarily required to be implemented or provided. More or fewer devices may alternatively be implemented or provided.

In particular, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 709, or installed from the storage device 708, or installed from the ROM 702. The computer program, when executed by the processing unit 701, causes the processing unit to execute the above functions defined in the methods according to the embodiments of the present disclosure.

It should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, a client and server may communicate using any currently known or future developed network protocol such as HTTP (HyperText Transfer Protocol) and may interconnect with any form or medium of digital data communication (such as communication networks). Examples of communication networks include Local Area Networks (LANs), Wide Area Networks (WANs), the Internet (such as the Internet), and end-to-end networks (such as ad hoc end-to-end networks), as well as any network currently known or future developed.

The computer-readable medium may be included in the electronic device described above; or it may stand alone without being assembled into the electronic device.

The above computer-readable medium carrying one or more programs, when the one or more programs are executed by the electronic device, causing the electronic device: while displaying a capturing page, determining a current key part proportion information based on a current preview image collected by a camera, wherein the current key part proportion information is information on proportion of key parts of a subject in the current preview image collected by the camera; generating current capturing prompt information based on the current key part proportion information, and presenting the current capturing prompt information in the capturing page, the current capturing prompt information comprising at least one of capturing angle prompt information or capturing distance prompt information; and in response to a capturing instruction, controlling the camera to capture the subject.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The beneficial effects of the electronic device, the program and the storage medium provided by the embodiments of the present disclosure may refer to beneficial effects analysis for the method of capturing, will not be repeated.

The flowcharts and the block diagrams in the drawings illustrate system architectures, functions and operations that may be implemented based on the system, method, and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The modules described in the embodiments of the present disclosure may be implemented by way of software or hardware.

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present disclosure, an example 1 provides a method of capturing comprising:
  while displaying a capturing page, determining a current key part proportion information based on a current preview image collected by a camera, wherein the current key part proportion information is information on proportion of key parts of a subject in the current preview image collected by the camera;
  generating current capturing prompt information based on the current key part proportion information, and presenting the current capturing prompt information in the capturing page, the current capturing prompt information comprising at least one of capturing angle prompt information or capturing distance prompt information; and
  in response to a capturing instruction, controlling the camera to capture the subject.

According to one or more embodiments of the present disclosure, an example 2 according to the method of the example 1, determining the current key part proportion information based on the current preview image collected by the camera comprises:
  obtaining the current preview image collected by the camera;
  determining, based on the current preview image, first key point information of the subject as current posture information of the subject; and
  determining the current key part proportion information based on the current posture information.

According to one or more embodiments of the present disclosure, an example 3 according to the method of the example 1, generating the current capturing prompt information based on the current key part proportion information comprises:
  using the current key part proportion information as the current capturing prompt information; or,
  generating the current capturing prompt information based on a relative size between the current key part proportion information and predetermined key part proportion information; or,
  determining capturing correction information based on deviation information between the current key part proportion information and the predetermined key part proportion information and using the capturing correction information as the current capturing prompt information.

According to one or more embodiments of the present disclosure, an example 4 according to the method of the example 1, further comprising:
  displaying a target posture template over a preview image displayed in the capturing page, wherein the target posture template is used to guide the subject to present a corresponding capturing posture.

According to one or more embodiments of the present disclosure, an example 5 according to the method of the example 4, the target posture template is a posture template corresponding to a posture picture selected from recommended posture pictures, and before displaying the target posture template over the preview image displayed in the capturing page, the method further comprising:
  obtaining target capturing information of the subject, wherein the target capturing information comprises at least one of posture information of the subject or capturing environment information when receiving a posture recommendation operation;
  determining the recommended posture picture based on the target capturing information; and
  displaying a recommended posture list for presenting the recommended posture picture.

According to one or more embodiments of the present disclosure, an example 6 according to the method of the example 5, determining the recommended posture picture based on the target capturing information comprises:
  generating a posture picture obtaining request carrying the target capturing information, and sending the posture picture obtaining request to a server to request the server to determine the recommended posture picture based on a matching degree between capturing information of a plurary of posture pictures in a posture picture library and the target capturing information; and receiving the recommended posture picture returned by the server based on the posture picture obtaining request.

According to one or more embodiments of the present disclosure, an example 7 according to the method of the example 4, the target posture template is a posture template corresponding to an imported posture picture, and before displaying the target posture template over the preview image displayed in the capturing page, the method further comprises:

obtaining the imported posture picture;

determining second key point information of a character image in the imported posture picture; and generating a posture template corresponding to the imported posture picture based on the second key point information.

According to one or more embodiments of the present disclosure, an example 7 according to the method of the examples 4 to 7, the capturing instruction is a capturing instruction, and after controlling the camera to capture the subject, the method further comprises:

retouching the original picture obtained by the capturing to obtain a target picture, and saving the original picture and the target picture.

According to one or more embodiments of the present disclosure, an example 9 according to the method of the example 8, retouching the original picture obtained by the capturing to obtain a target picture comprises:

retouching, based on picture information of a target posture picture corresponding to the target posture template, the original picture to obtain the target picture, wherein the picture information comprises at least one of color information of the target posture picture or image information of a target object in the target posture picture, and the image information comprises at least one of size information or position information of the target object.

According to one or more embodiments of the present disclosure, an example 10 provides an apparatus for capturing, comprising:

a proportion information determination module configured to, while displaying a capturing page, determine a current key part proportion information based on a current preview image collected by a camera, wherein the current key part proportion information is information on proportion of key parts of a subject in the current preview image collected by the camera;

a prompt information presentation module configured to generate current capturing prompt information based on the current key part proportion information, and presenting the current capturing prompt information in the capturing page, the current capturing prompt information comprising at least one of capturing angle prompt information or capturing distance prompt information; and a capturing module configured to in response to a capturing instruction, control the camera to capture the subject.

According to one or more embodiments of the present disclosure, an example 11 provides an electronic device, comprising:

a processor; and a memory for storing a program, when the program is executed by the processor, the processor implements a method of capturing according to any of examples 1 to 9.

According to one or more embodiments of the present disclosure, an example 12 provides a computer readable storage medium having a computer program stored thereon, the computer program executable by a processor to implement a method of capturing according to any of examples 1 to 9.

I claim:

1. A method of capturing, comprising:

while displaying a capturing page, determining a current key part proportion information based on a current preview image collected by a camera, wherein the current key part proportion information is information on proportion of key parts of a subject in the current preview image collected by the camera;

in response to a triggering instruction, displaying a target posture template, wherein the target posture template is determined based on an imported posture picture or a posture picture selected from recommended posture pictures;

generating current capturing prompt information based on at least one of the current key part proportion information and a matching degree between current posture information of the subject and the target posture template, and presenting the current capturing prompt information in the capturing page, the current capturing prompt information comprising at least one of capturing angle prompt information or capturing distance prompt information; and in response to a capturing instruction, controlling the camera to capture the subject.

2. The method of claim 1, wherein determining the current key part proportion information based on the current preview image collected by the camera comprises:

obtaining the current preview image collected by the camera;

determining, based on the current preview image, first key point information of the subject as current posture information of the subject; and determining the current key part proportion information based on the current posture information.

3. The method of claim 1, wherein generating the current capturing prompt information based on the current key part proportion information comprises:

using the current key part proportion information as the current capturing prompt information; or, generating the current capturing prompt information based on a relative size between the current key part proportion information and predetermined key part proportion information; or, determining capturing correction information based on deviation information between the current key part proportion information and the predetermined key part proportion information, and using the capturing correction information as the current capturing prompt information.

4. The method of claim 1, wherein the displaying of the target posture template comprises:

displaying a target posture template over a preview image displayed in the capturing page, wherein the target posture template is used to guide the subject to present a corresponding capturing posture.

5. The method of claim 4, wherein the target posture template is a posture template corresponding to the posture picture selected from recommended posture pictures, and before displaying the target posture template over the preview image displayed in the capturing page, the method further comprising:

obtaining target capturing information of the subject, wherein the target capturing information comprises at least one of posture information of the subject or capturing environment information when receiving a posture recommendation operation;

determining the recommended posture picture based on the target capturing information; and displaying a recommended posture list for presenting the recommended posture picture.

6. The method of claim 5, wherein determining the recommended posture picture based on the target capturing information comprises:

generating a posture picture obtaining request carrying the target capturing information, and sending the posture picture obtaining request to a server to request the server to determine the recommended posture picture based on a matching degree between capturing information of a plurality of posture pictures in a posture picture library and the target capturing information; and receiving the recommended posture picture returned by the server based on the posture picture obtaining request.

7. The method of claim 4, wherein the target posture template is a posture template corresponding to the imported posture picture, and before displaying the target posture template over the preview image displayed in the capturing page, the method further comprises:

obtaining the imported posture picture;

determining second key point information of a character image in the imported posture picture; and generating a posture template corresponding to the imported posture picture based on the second key point information.

8. The method of claim 4, wherein the capturing instruction is a capturing instruction, and after controlling the camera to capture the subject, the method further comprises:

retouching the original picture obtained by the capturing to obtain a target picture, and saving the original picture and the target picture.

9. The method of claim 8, wherein retouching the original picture obtained by the capturing to obtain a target picture comprises:

retouching, based on picture information of a target posture picture corresponding to the target posture template, the original picture to obtain the target picture, wherein the picture information comprises at least one of color information of the target posture picture or image information of a target object in the target posture picture, and the image information comprises at least one of size information or position information of the target object.

10. An electronic device, comprising:

a processor; and a memory for storing a program, when the program is executed by the processor, the processor implements acts comprising:

while displaying a capturing page, determining a current key part proportion information based on a current preview image collected by a camera, wherein the current key part proportion information is information on proportion of key parts of a subject in the current preview image collected by the camera;

in response to a triggering instruction, displaying a target posture template, wherein the target posture template is determined based on an imported posture picture or a posture picture selected from recommended posture pictures;

generating current capturing prompt information based on at least one of the current key part proportion information and a matching degree between current posture information of the subject and the target posture template, and presenting the current capturing prompt information in the capturing page, the current capturing prompt information comprising at least one of capturing angle prompt information or capturing distance prompt information; and in response to a capturing instruction, controlling the camera to capture the subject.

11. The device of claim 10, wherein determining the current key part proportion information based on the current preview image collected by the camera comprises:

obtaining the current preview image collected by the camera;

determining, based on the current preview image, first key point information of the subject as current posture information of the subject; and determining the current key part proportion information based on the current posture information.

12. The device of claim 10, wherein generating the current capturing prompt information based on the current key part proportion information comprises:

using the current key part proportion information as the current capturing prompt information; or, generating the current capturing prompt information based on a relative size between the current key part proportion information and predetermined key part proportion information; or, determining capturing correction information based on deviation information between the current key part proportion information and the predetermined key part proportion information, and using the capturing correction information as the current capturing prompt information.

13. The device of claim 10, wherein the displaying of the target posture template comprises:

displaying the target posture template over a preview image displayed in the capturing page, wherein the target posture template is used to guide the subject to present a corresponding capturing posture.

14. The device of claim 13, wherein the target posture template is a posture template corresponding to the posture picture selected from the recommended posture pictures, and before displaying the target posture template over the preview image displayed in the capturing page, the acts further comprising:

obtaining target capturing information of the subject, wherein the target capturing information comprises at least one of posture information of the subject or capturing environment information when receiving a posture recommendation operation;

determining the recommended posture picture based on the target capturing information; and displaying a recommended posture list for presenting the recommended posture picture.

15. The device of claim 14, wherein determining the recommended posture picture based on the target capturing information comprises:

generating a posture picture obtaining request carrying the target capturing information, and sending the posture picture obtaining request to a server to request the server to determine the recommended posture picture based on a matching degree between capturing information of a plurality of posture pictures in a posture picture library and the target capturing information; and receiving the recommended posture picture returned by the server based on the posture picture obtaining request.

16. The device of claim 13, wherein the target posture template is a posture template corresponding to the imported posture picture, and before displaying the target posture template over the preview image displayed in the capturing page, the acts further comprises:
   obtaining the imported posture picture;
   determining second key point information of a character image in the imported posture picture; and
   generating a posture template corresponding to the imported posture picture based on the second key point information.

17. The device of claim 13, wherein the capturing instruction is a capturing instruction, and after controlling the camera to capture the subject, the acts further comprises:
   retouching the original picture obtained by the capturing to obtain a target picture, and saving the original picture and the target picture.

18. The device of claim 17, wherein retouching the original picture obtained by the capturing to obtain a target picture comprises:
   retouching, based on picture information of a target posture picture corresponding to the target posture template, the original picture to obtain the target picture, wherein the picture information comprises at least one of color information of the target posture picture or image information of a target object in the target posture picture, and the image information comprises at least one of size information or position information of the target object.

19. A non-transitory computer readable storage medium having a computer program stored thereon, the computer program executable by a processor to implement acts comprising:
   while displaying a capturing page, determining a current key part proportion information based on a current preview image collected by a camera, wherein the current key part proportion information is information on proportion of key parts of a subject in the current preview image collected by the camera;
   in response to a triggering instruction, displaying a target posture template,
      wherein the target posture template is determined based on an imported posture picture or a posture picture selected from recommended posture pictures;
   generating current capturing prompt information based on at least one of the current key part proportion information and a matching degree between current posture information of the subject and the target posture template, and presenting the current capturing prompt information in the capturing page, the current capturing prompt information comprising at least one of capturing angle prompt information or capturing distance prompt information; and
   in response to a capturing instruction, controlling the camera to capture the subject.

20. The medium of claim 19, wherein determining the current key part proportion information based on the current preview image collected by the camera comprises:
   obtaining the current preview image collected by the camera;
   determining, based on the current preview image, first key point information of the subject as current posture information of the subject; and
   determining the current key part proportion information based on the current posture information.

* * * * *